US008583939B2

(12) United States Patent
Lee et al.

(10) Patent No.: US 8,583,939 B2
(45) Date of Patent: Nov. 12, 2013

(54) METHOD AND APPARATUS FOR SECURING INDIRECT FUNCTION CALLS BY USING PROGRAM COUNTER ENCODING

(75) Inventors: Gyungho Lee, Gyeonggi-do (KR); Chang Woo Pyo, Seoul (KR)

(73) Assignees: Korea University Research and Business Foundation, Seoul (KR); Hongik University Industry—Academia Cooperation Foundation, Seoul (KR)

( * ) Notice: Subject to any disclaimer, the term of this patent is extended or adjusted under 35 U.S.C. 154(b) by 313 days.

(21) Appl. No.: 12/969,688

(22) Filed: Dec. 16, 2010

(65) Prior Publication Data
US 2012/0011371 A1    Jan. 12, 2012

(30) Foreign Application Priority Data
Jul. 12, 2010    (KR) .................. 10-2010-0067009

(51) Int. Cl.
*G06F 21/00*    (2013.01)
(52) U.S. Cl.
USPC ............................................ 713/190; 726/26
(58) Field of Classification Search
USPC ............................................ 726/26; 713/190
See application file for complete search history.

(56) References Cited

U.S. PATENT DOCUMENTS

| 5,797,014 | A  | * | 8/1998  | Gheith ........................... 717/163 |
| 5,845,118 | A  | * | 12/1998 | Gheith ........................... 717/158 |
| 7,853,803 | B2 | * | 12/2010 | Milliken ......................... 713/190 |
| 7,971,255 | B1 | * | 6/2011  | Kc et al. ......................... 726/24 |
| 2006/0112374 | A1 | * | 5/2006 | Oliva ............................. 717/127 |
| 2007/0118763 | A1 | * | 5/2007 | Kamei ........................... 713/190 |
| 2009/0113217 | A1 | * | 4/2009 | Dolgunov et al. ............. 713/190 |
| 2010/0011209 | A1 | * | 1/2010 | Kiriansky et al. ............. 713/166 |
| 2010/0251378 | A1 | * | 9/2010 | Eker et al. ....................... 726/26 |
| 2011/0078420 | A1 | * | 3/2011 | Trescher et al. ............... 712/221 |
| 2011/0289586 | A1 | * | 11/2011 | Kc et al. .......................... 726/24 |
| 2012/0317423 | A1 | * | 12/2012 | Dolgunov et al. ............. 713/190 |

OTHER PUBLICATIONS

Changwoo Pyo and Gyungho Lee, Encoding Function Pointers and Memory Arrangement Checking against Buffer Overflow Attack, 2002, ICICS 2002, Springer.*

* cited by examiner

*Primary Examiner* — David Garcia Cervetti
(74) *Attorney, Agent, or Firm* — Pearne & Gordon LLP (57) ABSTRACT

A method for securing indirect function calls by using program counter encoding is provided. The method includes inserting a decoding code for an address of a library function stored in a GOT (Global Offset Table) entry into a PLT (Procedure Linkage Table) entry when an object file is built; generating an encoding key corresponding to the decoding code; and encoding the GOT entry corresponding to the library function by using the encoding key when program execution begins.

13 Claims, 6 Drawing Sheets

METHOD AND APPARATUS FOR SECURING INDIRECT FUNCTION CALLS BY USING PROGRAM COUNTER ENCODING

CROSS-REFERENCE TO RELATED APPLICATION

This application claims the benefit of Korean Patent Application No. 10-2010-0067009 filed on Jul. 12, 2010, the entire disclosures of which are incorporated herein by reference.

FIELD OF THE INVENTION

The present disclosure relates to a method and apparatus for securing indirect function calls for shared library functions by using program counter encoding.

BACKGROUND OF THE INVENTION

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs or other computer programs executing on those computer systems. One of the most destructive methods of attacking a computer system has been to send a "worm" to a computer program. A worm is a self-propagating attack that exploits vulnerability by taking control of the computer system and using that computer system to launch attacks against other computer systems with the same vulnerability.

Developers of applications and administrators of computer systems spare no effort and expense to identify and remove vulnerabilities. Because of the complexity of applications, however, it is virtually impossible to identify and remove all vulnerabilities before applications are released. After applications are released, developers may become aware of vulnerabilities in various ways. A party with no malicious intent may identify vulnerability in an application and may secretly notify the developer so that the vulnerability can be removed before hackers identify and exploit it.

Hackers can snatch control flow by writing a "desired" address into a code pointer referenced by an indirect branch instruction. If the indirect branch instruction is executed, program counter (PC) is set to point to the attackers' way. Most common code pointers in terms of frequency are return addresses stored in run time stack. Many protection schemes were proposed to guard the return address location, encrypt/hide the return address, or make a copy of the return address stack. However, little work has been done to handle other types of code pointers, particularly, the function pointers in the global offset table (GOT). GOT entries are set at run time by dynamic linker to link a program with a shared library.

Thus, there has been an increasing demand for a method and an apparatus capable of providing programs with effective protection schemes against attacks for acquiring control over computer systems by manipulating the code pointers to the functions without causing excessive overhead.

BRIEF SUMMARY OF THE INVENTION

In view of the foregoing, the present disclosure provides a method and an apparatus capable of providing protection scheme against attacks for acquiring control over computer systems by encoding addresses of library functions stored in the GOT, thus blocking the attacks that manipulate the GOT entries in an illegal way.

Further, the present disclosure also provides a method and an apparatus for securing indirect function calls by encoding the address of an actually called library function without having to encode addresses of all library functions.

In addition, the present disclosure also provides a method and an apparatus capable of reducing overhead on a computer system by decoding only the address of an actually called library function.

In accordance with one aspect of the present disclosure, there is provided a method for securing an indirect function call by a security apparatus using program counter encoding. The method includes inserting a decoding code for an address of a library function stored in a GOT (Global Offset Table) entry into a PLT (Procedure Linkage Table) entry when an object file is built; generating an encoding key corresponding to the decoding code; and encoding the GOT entry corresponding to the library function by using the encoding key when program execution begins.

In accordance with another aspect of the present disclosure, there is provided an apparatus for securing an indirect function call by using program counter encoding. The apparatus includes a decoding code inserting unit that inserts a decoding code for decoding an address of a library function stored in a GOT entry into a PLT entry; an encoding key generating unit that generates an encoding key for the address of the library function; and an encoding unit that encodes the address of the library function to be recorded in the GOT entry by using the encoding key.

In accordance with the present disclosure, an illegal attack can be blocked by restraining execution of indirect function calls initiated illegally by way of encrypting the address of a library function stored in a GOT entry.

Further, in accordance with the present disclosure, by decoding only the address of an actually called library function, a load on a server system that might be caused by the indirect function call securing method can be minimized.

BRIEF DESCRIPTION OF THE DRAWINGS

Non-limiting and non-exhaustive embodiments will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Hereinafter, embodiments of the present disclosure will be described in detail with reference to the accompanying drawings so that the present disclosure may be readily implemented by those skilled in the art. However, it is to be noted that the present disclosure is not limited to the embodiments but can be realized in various other ways. In the drawings, parts irrelevant to the description are omitted for the simplicity of explanation, and like reference numerals denote like parts through the whole document.

Further, through the whole document, an encoding/decoding process is not limited to any specific encoding/decoding algorithm. The present disclosure may be implemented by any existing algorithm or a single instruction that implements encoding/decoding or any encoding/decoding algorithm to be implemented in the future.

Below, terms and abbreviations will be first defined for the convenience of explanation.

A "linker" is a program that generates a single executable file by linking object files. The linker performs a process of relocating addresses of functions or variables defined in other object files. To distinguish this linker from a dynamic linker to be described later, this linker will be referred to as a "static linker" through the whole document.

A "library" is a binary file generated by linking one or more object files by the linker, and it contains functions shared by various executable files. Here, the term "library" includes both static and dynamic libraries. Through the whole document, the library and the executable file may be expressed together as an "executable file."

A "library function" refers to a function included in the library. The library function is called and executed when a process is initiated.

A "dynamic linker" is a program that dynamically links the shared libraries with the executable file when the executable file is executed.

A "PLT" is an abbreviation of a procedure linkage table. The PLT is a table that collects and stores therein stub functions which transfer control to the library functions within the shared libraries.

A "GOT" is an abbreviation of a global offset table. The GOT entry stores therein the address of a function referenced by a PLT entry.

"Relocation" is an operation of redefining values or addresses of global symbols if necessary.

"Encoded relocation" is an operation of encoding values and addresses assigned to pointer variables during the execution of relocation by extending functions of the static and dynamic linkers to have encoding capability. The encoded relocation may be performed at linking time or execution time.

"Program counter encoding" is a protocol for protecting PC-bound data in an executable file by an encoding/decoding process. Program counter encoding encrypts PC-bound data at their instantiation, and decrypts each of the PC-bound data at their deference. The PC-bound data may include procedure call/return addresses, non-local jumps such as setjmp( )/longjmp( ), function pointers of a procedure link or a library jump table, and so forth.

"PC-encoding" is an abbreviation of program counter encoding.

Figure 1:
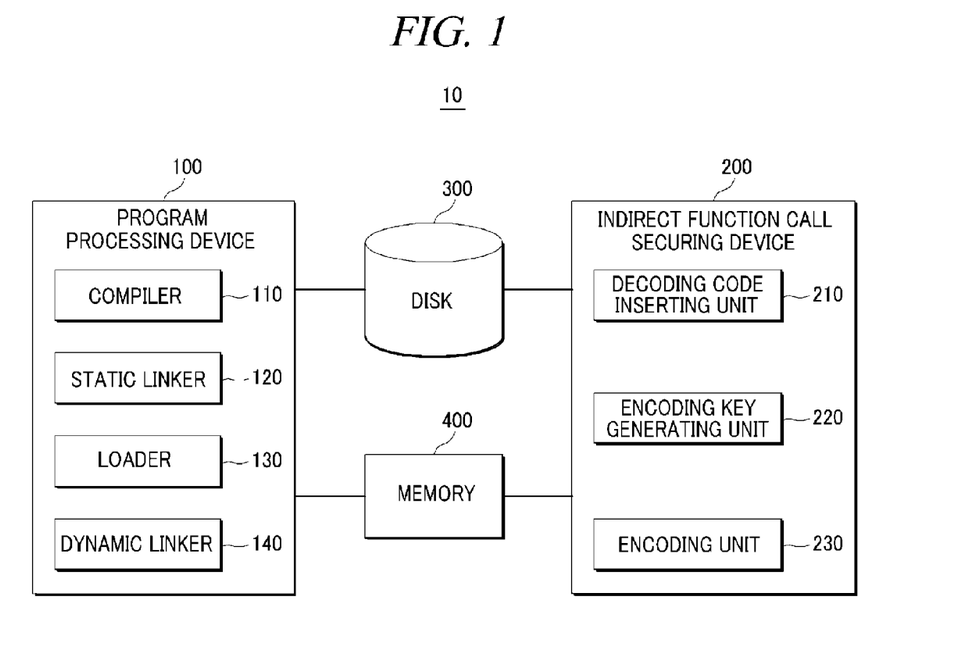
FIG. 1 is a block diagram of an indirect function call security system using program counter encoding in accordance with an embodiment of the present disclosure.
Figure 2:
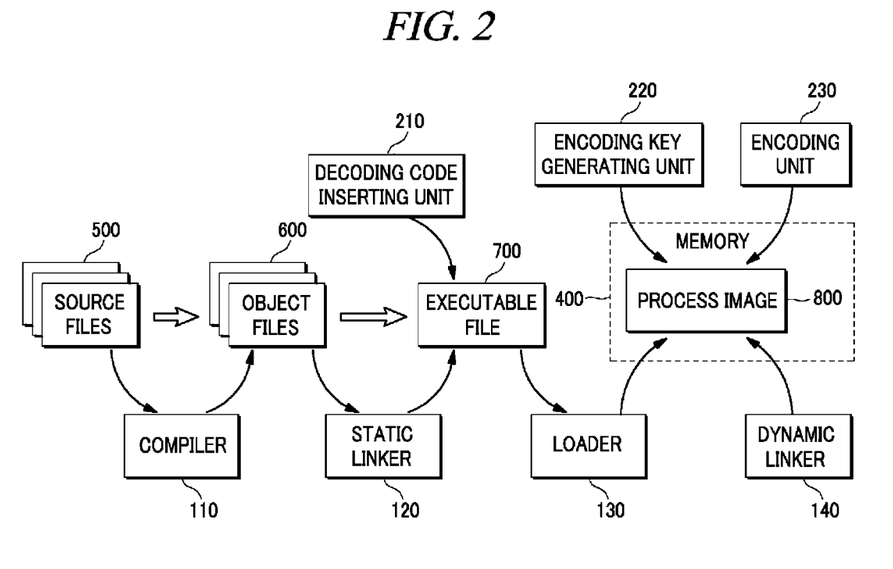
FIG. 2 is a block diagram for describing a process procedure of the indirect function call security system using program counter encoding in accordance with the embodiment of the present disclosure.

Now, the present disclosure will be described in detail with reference to the accompanying drawings. FIG. 1 is a block diagram showing a configuration of an indirect function call security system using program counter encoding in accordance with an embodiment of the present disclosure. FIG. 2 is a block diagram for describing a procedure of processing programs to secure indirect function calls using program counter encoding in accordance with the embodiment of the present disclosure.

As illustrated in FIG. 1, the indirect function call security system 10 in accordance with the embodiment of the present disclosure includes a program processing device 100, an indirect function call securing device 200, a disk 300 and a memory 400. The program processing device 100 may include a compiler 110, a static linker 120, a loader 130 and a dynamic linker 140. The indirect function call securing device 200 may include a decoding code inserting unit 210, an encoding key generating unit 220 and an encoding unit 230.

The compiler 110 compiles one or more source files 500 into object files 600. For example, the same number of object files 600 as the number of the source files 500 may be generated. Each object file 600 may include functions necessary for an executable file.

The static linker 120 generates a single executable file 700 by linking one or more object files 600. The object files 600 include functions necessary for executing the executable file 700, and the static linker 120 generates the executable file 700 by linking the object files 600 necessary for the executable file 700. The static linker 120 is capable of inserting a decoding code into a PLT entry in cooperation with the decoding code inserting unit 210 to be described later.

When the executable file is executed, the loader 130 loads the executable file 700 onto the memory 400 and generates a process image 800.

The dynamic linker 140 links shared libraries, which are dynamically linked with the executable file 700, with the process image 800 of the executable file 700 at execution time. The dynamic linker 140 is capable of encoding the address of a library function and storing the encoded address in a GOT entry in cooperation with the encoding key generating unit 220 and the encoding unit 230 to be described later. The encoding key necessary for the encoding may be generated at this time.

The decoding code inserting unit 210 inserts a decoding code into the PLT entry of the executable file 700. The decoding code inserting unit 210 inserts the decoding code for decoding the GOT entry referenced by the PLT entry into the PLT entry. The decoding code inserting unit 210 may be implemented by being combined with the static linker 120 or by extending the functions of the static linker 120. The insertion of the decoding code may be performed concurrently with the operation of generating the executable file 700 by linking the object files 600 by the static linker 120. The encoding key generating unit 220 generates the encoding key for encoding the address of the library function. The encoding key maybe used later when the encoding unit 230 encodes the address of the library function. By way of example, the single encoding key may be generated for each shared library or each library function.

Meanwhile, by performing encoding while using a plurality of encoding keys for a single shared library or a library function, protection can be improved further. For example, assume that the encoded address of the library function is decoded without using the valid encoding key in case that the address of the library function has been encoded plural times and has been kept separately by using the plurality of encoding keys. In such case, the addresses of the library function decoded by using invalid encoding keys may not coincide with each other. In view of such a discrepancy in decoded addresses, a system operator may be informed of an abnormal attack on the system.

The encoding key generating unit 220 may be implemented by being combined with the dynamic linker 140 or by extending the functions of the dynamic linker 140.

The encoding unit 230 encodes the library function address stored in the GOT entry. When the dynamic linker 140 links the executable file 700 with the shared libraries, the dynamic linker 140 stores the library function address in the GOT entry. The encoding unit 230 encodes the library function address stored in the GOT entry by the dynamic linker 140 by using the generated encoding key. The encoding unit 230 may be implemented by being combined with the dynamic linker 140 or by extending the functions of the dynamic linker 140. The disk 300 stores therein the source files 500, the object files 600 and the generated executable file 700.

The memory 400 is a device on which the executable file 700 and the shared libraries are loaded and executed. When the executable file 700 is executed, the executable file 700 and the shared libraries are loaded onto the memory 400 by the loader 130, and the process image 800 is generated. The respective process image 800 loaded onto the memory may be linked by the dynamic linker 140. The memory 400 may be used in the form of a virtual memory by a kernel of an operating system. Through the whole document, the term "memory" may include both a virtual memory and a physical memory.

As illustrated in FIG. 2, a method for securing an indirect function call by using program counter encoding, e.g., encoded relocation, involves the processes of inserting the decoding code for the library function address stored in the GOT entry into the PLT entry when the object files 600 are built; and generating the encoding key corresponding to the decoding code; and encoding the GOT entry corresponding to the library function by using the generated encoding key. The decoding code may be used to decode an initial address stored in the GOT entry after the executable file is loaded onto the memory 400.

Below, the processes of inserting the decoding code into the PLT entry and encoding the GOT entry will be explained in more detail with reference to FIGS. 3 and 4.

Figure 3:
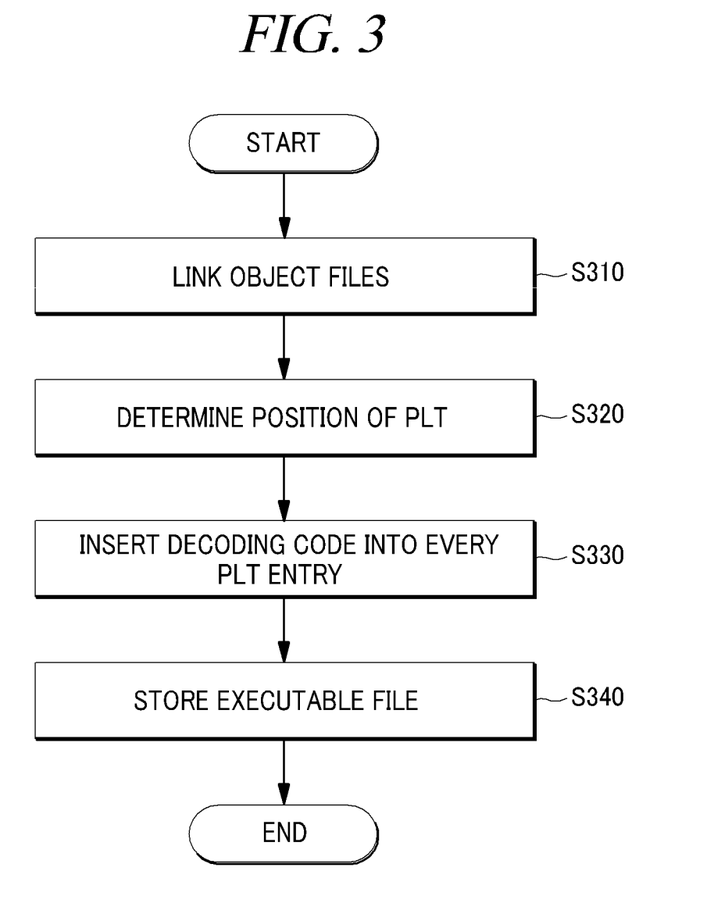
FIG. 3 is a flowchart of a decoding code insertion process in accordance with the embodiment of the present disclosure.

FIG. 3 is a flowchart for describing the process of inserting the decoding code in accordance with the embodiment of the present disclosure.

As can be seen from FIG. 3, the process of inserting the decoding code is performed when the static linker 120 is operated. The object files 600 generated by the compiler 110 are linked by the static linker 120 (S310). The static linker 120 is capable of generating the executable file 700 by linking the object files 600 through the relocation process of adjusting the global symbol addresses.

The object files 600 may include a main function of the executable file 700 or other functions called by the main function.

During the process of linking the object files 600, the decoding code inserting unit 210 determines the address of the PLT within the executable file 700 (S320), and a PLT entry represents the address of a library function. The decoding code inserting unit 210 inserts the decoding code for the encoded library function address stored in the GOT into every PLT entry (S330). If the decoding code is inserted into every PLT entry of the executable file 700, the generation of the executable file 700 is completed, and the generated executable file 700 is stored in the disk 300 (S340).

Figure 4:
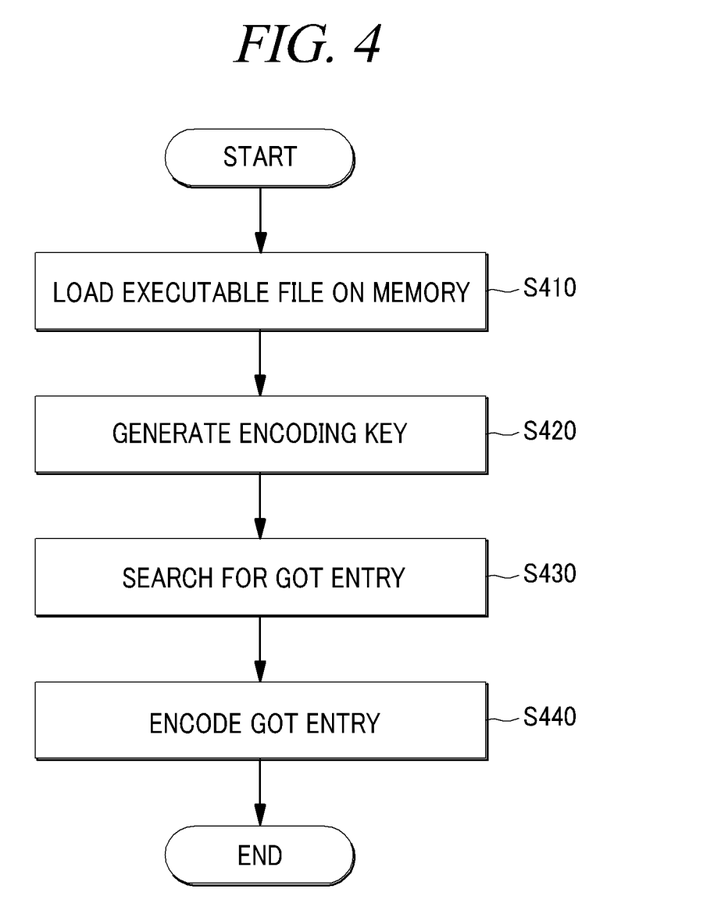
FIG. 4 is a flowchart of a GOT entry encoding process in accordance with the embodiment of the present disclosure.

FIG. 4 is a flowchart for describing the process of generating an encoding key and encoding a GOT entry.

As shown in FIG. 4, the processes of generating an encoding key and encoding a GOT entry are performed when the loader 130 and the dynamic linker 140 are operated. For the execution of the executable file 700, the loader 130 loads the executable file 700 onto the memory 400 and generates process image 800 on the memory 400 (S410). At this time, shared libraries necessary for the execution of the executable file 700 are also loaded onto the memory 400 by the loader 130 to complete the process image 800.

The encoding key generating unit 220 generates the encoding key required to encode the library function address necessary for the execution of the executable file 700 (S420). For example, the encoding key may be generated for each shared library or each library function in one-to-one correspondence, or the plurality of encoding keys may be generated for each shared library or each library function to enhance protection.

The encoding unit 230 may search for the GOT entry corresponding to the library function of which address is to be encoded (S430). After the GOT entry is searched, the encoding unit 230 encodes the code pointer in the GOT entry by using the generated encoding key (S440).

The aforementioned processes of generating the encoding key and encoding the GOT entry may be performed when the library function is called for the first time, while it may not be performed when the library function is re-called. Meanwhile, in another embodiment of the present disclosure, the processes of generating the encoding key and encoding the GOT entry may be performed for all relevant library functions when the executable file 700 is loaded, regardless of an actual call of the library function. Further, the initial value of the GOT entry may be encoded after the executable file 700 is loaded on the memory 400.

Figure 5:
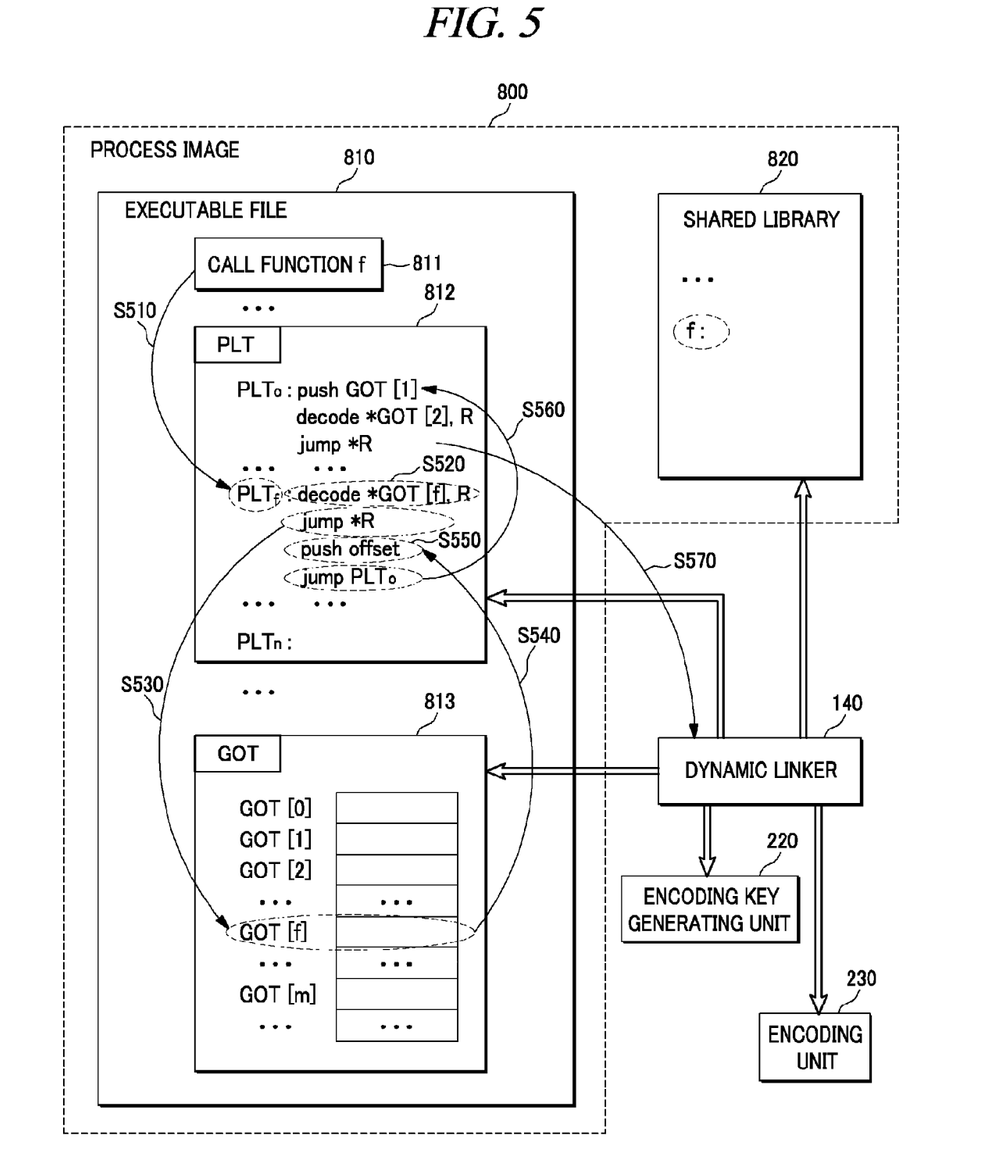
FIG. 5 is a view for describing a memory state and control flow during execution of an executable file in accordance with the embodiment of the present disclosure.

FIG. 5 is a view for describing a memory state during the execution of the executable file in accordance with the embodiment of the present disclosure.

As illustrated in FIG. 5, an executable image 810 of the executable file 700 and a shared library 820 are loaded on the memory 400, and the process image 800 is generated. The process image 800 may include an execution code, a data region, a PLT 812 and a GOT 813.

The loader 130 generates the executable image 810 of the executable file 700 on the memory 400. The dynamic linker 140 links the relevant shared library 820 to the process image 800 and relocates the executable image 810 of the executable file 700 and the shared library 820. The encoding key generating unit 220 and the encoding unit 230 encode the entries of the GOT 813, which is a target of encoding, in cooperation with the dynamic linker 140, whereby the generation of the process image 800 is completed.

Assuming that a function f in the shared library is called by the executable image 810 of the executable file 700, if a code 811 that calls the function f within the shared library 820 is executed, the code may jump to the PLT entry of the function f (S510).

$PLT_f$, which is the entry of PLT 812 for the function f includes a multiple number of instructions containing indirect branch that references the GOT[f]. Further, a code for decoding a code pointer of the GOT[f] has been inserted in the $PLT_f$ at linking time.

The code pointer of the GOT[f] is decoded by executing the decoding code (S520). If indirect branch is performed by using the code pointer of the decoded GOT[f], the process proceeds to the push instruction subsequent to the branch in case that the function f is called for the first time (S540). The push instruction moves to stack the offset to the relocation table entry (S550). Then, control transfers to the dynamic linker (S570) through $PLT_0$ (S560), and the dynamic linker resolves the symbol f, that is, identifies f's address. The execution process of the executable file 700 will be described below in detail with reference to FIG. 6.

Figure 6:
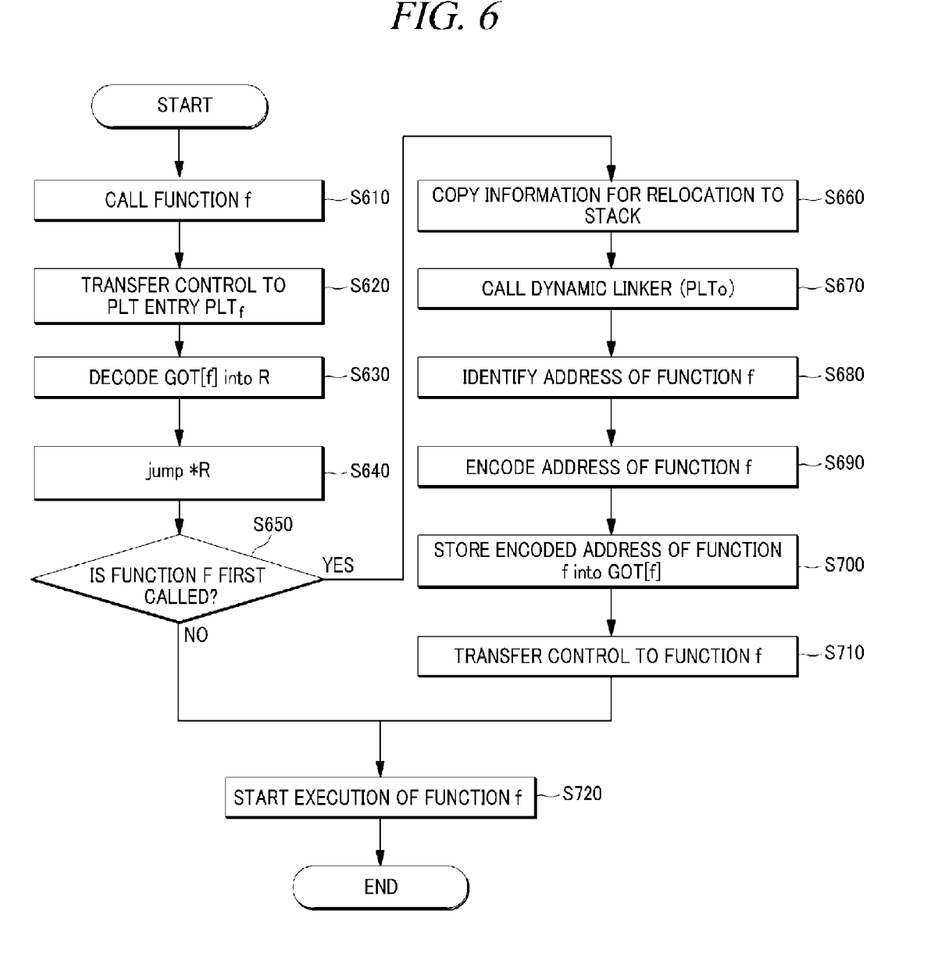
FIG. 6 is a flowchart for describing the process of encoded relocation of an executable file in accordance with the embodiment of the present disclosure.

FIG. 6 is a flowchart for describing the process of encoded relocation of an executable file in accordance with the embodiment of the present disclosure.

As shown in FIG. 6, if the function f within the shared library is called by the executable file 700 (S610), control transfers to the stub function PLT$_f$ corresponding to the function f in the PLT (S620). The GOT[f], which is a GOT entry referenced by PLT$_f$, is initialized to the encoded address of the jump instruction of PLT$_f$ (S550). The encoded GOT[f] is decoded, so that the real address value is obtained in R, where R may be a register or a memory location (S630).

The first call of the function f may lead control to the dynamic linker by way of the jump instruction of the PLT$_f$ (S570, S640). The dynamic linker encodes the actual address of the function f and stores in GOT[f] after the first invocation of the function f. The second and the following invocation of the function f may branch to the actual address of the function f and execute the function f.

When the function f is called for the first time (S650), the dynamic linker 140 is informed of the address where the information necessary for the encoded relocation of the GOT[f] exists from the stack (S660). The "jump PLT$_0$" instruction leads to PLT$_0$, and transfers control to the dynamic linker 140.

The dynamic linker 140 relocates the value of the GOT[f], so that the GOT[f] becomes the address of the function f. For the purpose, the dynamic linker 140 identifies the address of the function f on a virtual memory space (S680); the encoding key generating unit 220 generates the encoding key for encoding the virtual memory address of the function f; and the encoding unit 230 encodes the virtual memory address of the function f by using the encoding key (S690). The dynamic linker 140 stores the encoded address of the function f in the GOT[f] (S700) and transfers control to the function f (S710). Thereafter, the execution of the function f is begun (S720). When the indirect function call is protected by using the above-described method or apparatus, even if the attacker changes an address of a control data such as the GOT entry to a desired address, the address of the control data would be changed to an unexpected address through the decoding process. As a result, control flow cannot be transferred to the address intended by the attacker, and the execution of the executable file that calls the library function would be stopped and terminated, so that the intrusion of the attacker would be blocked. Thus, the system can be protected from the attack.

For example, the execution of the executable file that calls the library function f is terminated during the execution of the executable file when the library function f is called without encoding the address of the library function f using the correct key.

Furthermore, in case that the encoded library function is called in an invalid way, such an invalid call may be notified by an input/output device.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention. For example, each component described as a single one may be implemented by multiple sub-components, and components described as multiple elements may be implemented as a single component combined with others.

The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. A method for protecting against manipulation of a code pointer to a library function to be called by a program, the method performed by an apparatus comprising a memory onto which the program is loaded and a processor by which the program is executed, the method comprising:
    inserting, by a static linker, a sequence of instructions for decoding an address of the library function into a PLT (Procedure Linkage Table) entry;
    storing, by a dynamic linker, an encoded address of the library function into a GOT (Global Offset Table) entry; and
    decoding, by the sequence of instructions for decoding inserted in the PLT entry, the encoded address of the library function stored in the GOT entry, when the address of the library function is loaded into the PC (program counter) register of the processor;
    wherein the address of the library function is encoded with one or more encoding keys which is generated after the program is loaded onto the memory.

2. The method of claim 1, wherein the process of inserting the decoding instructions into the PLT entry includes:
    generating an executable file of the program by linking object file of the program;
    determining the PLT entry corresponding to a library function call in the program; and
    inserting a stub function for transferring the control flow of the program to the library function into the PLT entry.

3. The method of claim 1, wherein the GOT entry represents a code pointer for storing the address of the library function, and the decoding instructions decode the value stored in the code pointer.

4. The method of claim 1, further comprising:
    generating the one or more encoding keys; and
    encoding the address in the GOT entry corresponding to the address of the library function by using the one or more encoding keys.

5. The method of claim 1, wherein the process of storing the encoded address of the library function into the GOT entry is performed only when the library function is called for the first time and is not performed when the library function is re-called.

6. The method of claim 1, wherein the process of storing the encoded address of the library function into the GOT entry encodes the address initially stored in the GOT entry when the program is loaded onto the memory.

7. The method of claim 1, wherein the process of storing the encoded address of the library function into the GOT entry is performed when the program is executed, regardless of execution of the library function call.

8. The method of claim 1, wherein the process of storing the encoded address of the library function into the GOT entry is performed by the dynamic linker which encoding the address of the library function plural times using plural encoding keys.

9. An apparatus comprising a memory that a program is loaded onto and a processor which executes the program and a method for protecting against manipulation of a code pointer to a library function to be called by the program, the method comprising:
    inserting, by a static linker, a sequence of instructions for decoding an address of the library function into a PLT (Procedure Linkage Table) entry;

storing, by a dynamic linker, an encoded address of the library function into a GOT (Global Offset Table) entry; and decoding, by the sequence of instructions for decoding inserted in the PLT entry, the encoded address of the library function stored in the GOT entry, when the address of the library function is loaded into the PC (program counter) register of the processor;

wherein the address of the library function is encoded with one or more encoding keys which is generated after the program is loaded onto the memory.

10. The apparatus of claim 9, wherein the execution of the program is terminated when the decoded address of the library function is a wrong address of the library function.

11. The apparatus of claim 10, wherein an abnormal call of the library function is notified when the library function is wrong.

12. The apparatus of claim 9, wherein the dynamic linker encodes the address of the library function plural times using plural encoding keys.

13. The apparatus of claim 9, wherein the one or more encoding keys are generated for each library function or a group of library functions.

* * * * *